Feb. 18, 1930.  J. W. VAUGHAN  1,747,461
PROCESS OF CUTTING MEAT
Filed Sept. 21, 1926
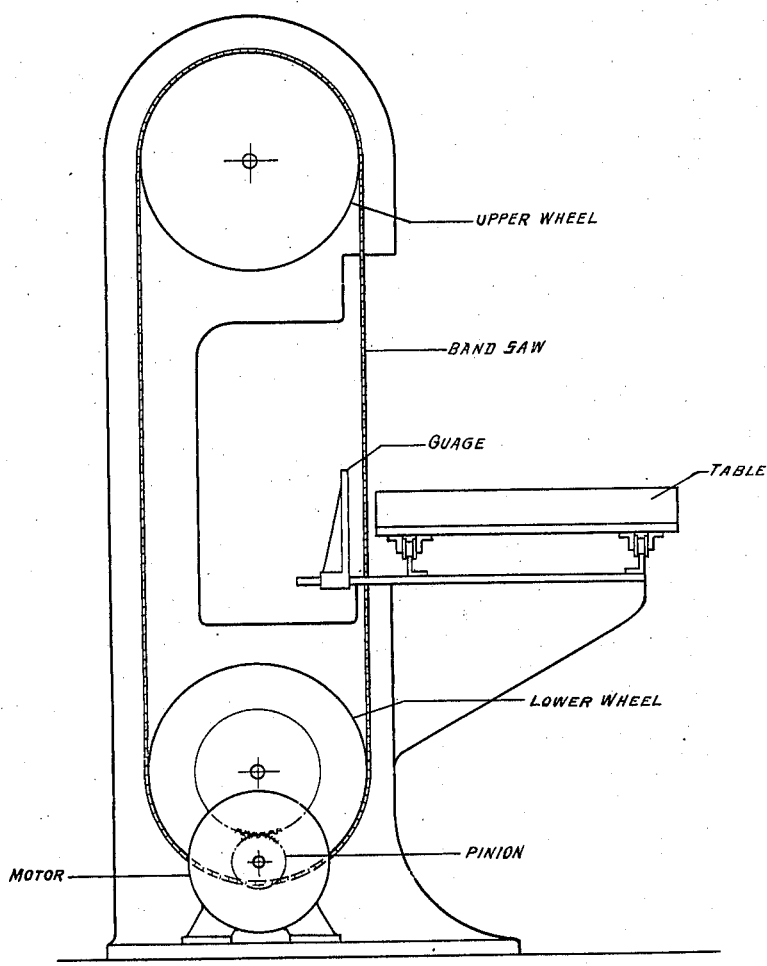
WITNESS
INVENTOR
JAY W. VAUGHAN
BY
ATTORNEYS Patented Feb. 18, 1930

1,747,461

UNITED STATES PATENT OFFICE

JAY W. VAUGHAN, OF CHICAGO, ILLINOIS, ASSIGNOR TO VAUGHAN COMPANY, OF CHICAGO, ILLINOIS, A DECLARATION OF TRUST

PROCESS OF CUTTING MEAT

Application filed September 21, 1926. Serial No. 136,758.

This invention relates to the process of cutting large sections of animal flesh and the bone contained therein and fish and the bone contained therein into smaller portions. It is adaptable for use in connection with cutting meat into steaks and chops and cutting fish into steaks and smaller portions. In the specification the reference to cutting meat is intended to include not only cutting animal flesh and fish but also bone and gristle.

It has heretofore been proposed in connection with the cutting of animal meat that a tooth implement, such as a saw, be used. Machines have been constructed and put in use, wherein this principle has been carried out by the utilization of an endless band saw but such machines were not successful in that the saw would not sever the flesh with a clean smooth cut but on the contrary such devices instead of cutting the flesh tore it leaving the surface thereof irregular and with protruding portions of meat fibre. Steaks, chops and the like so separated from a larger portion of meat were, for these reasons, unfit for sale. This invention proposes to overcome these objections, the practice thereof resulting in the cutting of steaks, chops and the like with a clean smooth cut so similar to a knife cut that it is hardly distinguishable therefrom. It has been found that by utilizing a tooth implement, the teeth whereof are set at a very slight angle, and by running the same at a very high speed, between twenty-one and twenty-four hundred feet per minute, flesh may be cut with the same smooth surface as obtained when cutting with a knife. This saw like implement will also cut through gristle, fat and bone. Should the speed of the saw like implement be substantially below twenty-one hundred feet per minute it will tear the meat. In fact, this was one of the reasons why machines, before this invention, were unsuccessful inasmuch as such machines were run at approximately fifteen hundred feet per minute. Should the speed of the implement substantially exceed twenty-four hundred feet per minute, for instance should it be run at twenty-five hundred feet per minute during the actual meat cutting operation, it would cause the meat and the bone to burn resulting in a discoloration thereof and thus rendering it unfit for sale. The most advantageous results are obtained by the utilization of an endless band saw with a slight set to the teeth thereof and maintaining the saw, when running freely, at a speed of about twenty-four hundred feet per minute. When the meat is directed against the saw running at the last mentioned speed it is slowed up slightly to about twenty-three hundred feet at which speed the individual teeth travelling at this very high speed will act as knives and sever the meat with a knife like cut. When the meat comes in contact with the bone it is slowed up but will, nevertheless, saw through it with entire satisfaction. A further advantage of maintaining the speed of the saw at approximately the maximum speed insures its correct operation should there be a lag in the motive power which tends to decrease the rate of speed of the saw. The decrease in the motive power will seldom be such as to slow up the speed of the saw below the safe minimum speed of approximately twenty-one hundred feet so that if the free run of the saw is maintained at a speed of twenty-four hundred feet there is little liability of the speed being decreased by the lag in the motive power.

This method of cutting meat may be carried out in many ways and for the purpose of explaining the preferred form a machine is illustrated in the accompanying drawing. The band saw is mounted upon suitable upper and lower wheels, the lower wheel being geared and driven by a pinion driven by an electric motor. The preferred type of motor is one which is capable of developing about 1750 R. P. M. The lower wheel should be about fourteen inches in diameter geared to about 656 R. P. M. which gives the band saw a speed of about 2,400 feet per minute. The meat is placed upon a reciprocating table with the end surface thereof abutting against the gage which is set to the thickness at which it is desired to cut the steak or the like. The table is then moved in a line parallel to the gage so that the meat comes in contact with the teeth of the fast travelling band saw in order to cut flesh, fat, bone and gristle. The severed slice will be of uniform thickness throughout and the cut of the flesh like that obtained by the use of a knife.

Fish, for instance, halibut, cod and salmon, may also be cut into steak or smaller portions in like manner.

These operations may be repeated upon a section of meat until it is cut up into the number of separate portions it is desirous of producing therefrom.

What I claim is:

1. The method of dividing meat into portions, which consists in applying a severing action to a transverse narrow zone of the meat, said severing action comprising a multiplicity of separate cuts traveling through the meat and along the line on which it is to be severed at a rate of speed between twenty-one hundred and twenty-four hundred feet per minute while continuously feeding the meat forwardly and guiding it while being severed.

2. The method of dividing meat into portions, which consists in determining the line along which the meat is to be cut, applying a severing action to a narrow zone lying on both sides of the line along which the meat is to be severed, said severing action comprising a multiplicity of separate cuts, delivered at opposite angles to said line and alternately at opposite sides of said line, said cuts when delivered to said meat traveling at twenty-one hundred and twenty-four hundred feet per minute while continuously feeding the meat forwardly and guiding it while being severed.

In testimony whereof I have hereunto set my hand.

JAY W. VAUGHAN.